Figure 1:
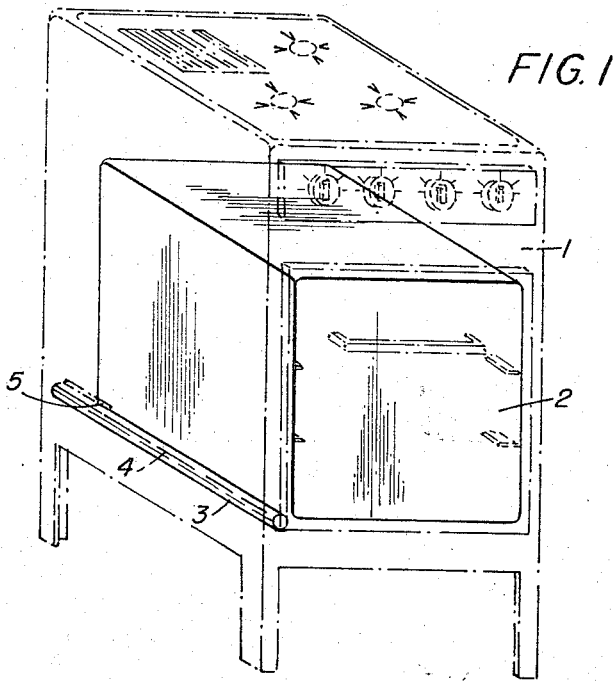

Aug. 1, 1967　　　　J. V. BAATRUP　　　　3,333,838
THERMOCOUPLE COMPRISING PLANAR SHEET METAL STRIP LEAD
HAVING A FORWARD END WHICH ENVELOPES THE OTHER LEAD
TO FORM A HOT JUNCTION AND GAS OVEN
COMPRISING SAID THERMOCOUPLE
Filed Sept. 17, 1962

INVENTOR
JOHANNES VAGN BAATRUP

United States Patent Office 3,333,838
Patented Aug. 1, 1967

3,333,838
THERMOCOUPLE COMPRISING PLANAR SHEET METAL STRIP LEAD HAVING A FORWARD END WHICH ENVELOPES THE OTHER LEAD TO FORM A HOT JUNCTION AND GAS OVEN COMPRISING SAID THERMOCOUPLE
Johannes Vagn Baatrup, Sonderborg, Denmark, assignor to Danfoss ved ing. M. Clausen, Nordborg, Denmark, a company of Denmark
Filed Sept. 17, 1962, Ser. No. 224,103
9 Claims. (Cl. 263—40)

This invention relates to a gas oven of the type having a heating compartment, e.g. a baking oven, a grill or a heating chamber, controlled by means of a thermocouple, usually controlling a pilot safety-valve for the gas supply.

Thermocouples heretofore proposed for gas ovens have been of a construction such that both junctions were protected by forming one of the conductors of the thermocouple as a tube concentrically enveloping the other conductor and by locating both junctions inside the tube. This type of construction was deemed absolutely necessary because of the universal belief that the thermocouple, and in particular the junctions, inevitably would be damaged when cleaning the oven. Furthermore, it has been desired to avoid the soiling of the junctions when food boiled over.

Because those skilled in the art have considered this type of construction for thermocouples for gas ovens to be indispensable, rather complex and costly constructions have characterized gas-oven thermocouples heretofore known.

It is an object of the invention to provide a thermocouple construction which avoids the complexities and costly features of prior gas-oven thermocouples yet which is fully effective.

It is a further object of the invention to provide a thermocouple of the character indicated in association with a gas oven.

In accordance with the invention, a thermocouple is provided having at least partly detached junctions and, when the thermocouple is associated with an oven, these junctions are disposed in the heating compartment of the oven.

With the thermocouple located in the heating compartment, none of the above-mentioned dangers exists, or can be easily avoided.

Without difficulty, the thermocouple can be disposed in the heating compartment in such manner that it is exposed to the influence of the flame, but will not be touched mechanically during ordinary cleaning. The danger of being soiled by spilled food is avoided primarily because the thermocouple is remote from any food placed in the heating compartment and, therefore, is not touched by food particles. Furthermore, the thermocouple can be disposed either on one of the walls or at the top, instead of at the bottom, of the heating compartment. In muffle (indirectly heated) ovens, the thermocouple is completely separated from the compartment space itself. A thermocouple having separated junctions is less complex and is much less costly to manufacture than are thermocouples hitherto used in the heating compartments of gas ovens. Indeed, the cost of a thermocouple constructed in accordance with this invention is as little as 20 percent of the cost of thermocouples of the type heretofore manufactured and considered essential for gas ovens.

According to a particularly advantageous embodiment of this invention, one of the conductors or leads of the thermocouple consists of a sheet metal strip having a foremost end which envelopes the other conductor or lead, thus forming the hot junction, and thereby providing a hot junction having a relatively large surface of contact. At the same time, the junction which is influenced by the flame is shielded against direct flame contact by means of the enveloping conductor.

In accordance with a further feature of the invention, the sheet metal strip can be provided with holes or recesses for fixing the thermocouple, thus eliminating the necessity for providing the securing devices heretofore considered essential in gas-oven thermocouples previously proposed. Since part of the thermocouple itself is used for attachment, there will be no displacement of the thermocouple relatively to a securing device, which may occur in known constructions and which may lead to faulty operation. The attachment of the device of this invention is effected merely by means of one or two screws, engaged in threaded holes which can be located directly on the burner.

The rearmost end of the sheet metal strip can advantageously be provided with an upwardly-bent flange portion effective to brace the other lead by receiving it in a recess provided in the flange and cooperating with an insulating member. There is thus obtained a thermocouple which is rigid in itself, and, in spite of its small dimensions, there is no danger of a short circuit.

Preferably, the recess in the flange also has a narrow extension, in the direction of the fold line between the flange and the main body of the strip, through which is led the inlet connection to the first lead. This ensures that the connection will not damage upon bending of the inlet connection.

Figure 2:
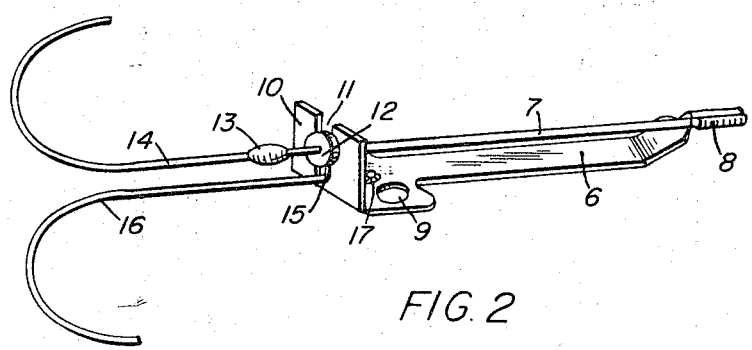

Further characteristics of the invention will be apparent from the following detailed description of an illustrative embodiment thereof, and from the accompanying drawing wherein, FIG. 1 is a diagrammatic perspective view of a muffle oven showing the burner of the oven with an associated thermocouple; and FIG. 2 is a perspective view of a thermocouple embodying features of the invention.

Referring to the drawing, the gas stove 1 contains a muffle oven 2, acting as a baking or grill compartment, in which the food-receiving compartment is separated from the burner arrangement 3, which consists of a tube having a series of gas outlet holes 4.

The thermocouple 5 is screwed directly onto the rearmost end of the burner tube. According to the embodiment shown in FIG. 2, the thermocouple 5 consists of a lead 6 formed by a sheet metal strip, e.g. of iron, and a second lead 7 formed by a wire, e.g. of constantan. At 8, one end of the sheet metal strip 6 envelopes one end of the wire 7, and by means of soldering the hot junction is thus formed at 8.

At the second end of the sheet metal strip 6 are formed two holes 9 which are used in connection with fixing screws (not shown) to secure the thermocouple directly onto the supporting body. The second end of the sheet metal strip 6 forms a rectangular flange 10 having a recess 11 into which an insulating washer 12 is inserted, and the lead 7 is passed through this washer. The inlet connection is connected at the soldered junction 13. The other inlet connection 16 is passed through the narrow extension 15 of the recess and then firmly fixed by means of soldering at junction 17. The expression "junction" as used herein includes all types of contact used in connection with thermocouples, e.g., soldering, welding or clamping junctions. The strip 6 need not be made of iron, but can be made of any metal suitable for use in thermocouples.

It will also be understood that the thermocouple can be used in a heating compartment in which the burners are located inside the food-receiving compartment which is thus directly heated instead of being indirectly heated as in a muffle oven, and in this case as well there is no danger of mechanical damage or soiling if the thermocouple is as shown in relation to the burner. The thermocouple is of course connected to control the flow of gas to the burner in conventional manner and a typical connection of this type is shown, for example, in U.S. Patent No. 2,946,376, dated July 26, 1960.

It will also be understood that various changes and modifications may be made in the embodiments herein described without departing from the scope of the invention as defined in the appended claims. It is intended, therefore, that all matter contained in the foregoing description and in the drawing shall be interpreted as illustrative only and not as limitative of the invention.

What I claim and desire to secure by Letters Patent is:

1. A gas oven having a heating compartment and a thermocouple disposed in said heating compartment for controlling heat input to the heating compartment, said thermocouple having at least partially separated junctions, one of the leads of said thermocouple consisting of a planar sheet metal strip having a forward end which envelopes the other lead of the thermocouple to form the hot junction of the thermocouple.

2. A gas oven having a heating compartment and a thermocouple disposed in said heating compartment for controlling heat input to the heating compartment, said thermocouple having at least partially separated junctions, one of the leads of said thermocouple consisting of a planar sheet metal strip having a forward end which envelopes the other lead of the thermocouple to form the hot junction of the thermocouple, and said sheet metal strip being formed with apertures for reception of securing means to fasten the thermocouple to a supporting surface.

3. A gas oven having a heating compartment and a thermocouple disposed in said heating compartment for controlling heat input to the heating compartment, said thermocouple having at least partially separated junctions, one of the leads of said thermocouple consisting of a planar sheet metal strip having a forward end which envelopes the other lead of the thermocouple to form the hot junction of the thermocouple, and the rearmost end of said sheet metal strip being provided with a flange portion formed with a recess to retain an insulation member for supporting said other lead.

4. A gas oven having a heating compartment and a thermocouple for controlling heat input to the heating compartment disposed in said heating compartment, said thermocouple having at least partially separated junctions, one of the leads of said thermocouple consisting of a planar sheet metal strip having a forward end which envelopes the other lead of the thermocouple to form the hot junction of the thermocouple, and the rearmost end of said sheet metal strip being provided with a flange portion formed with a recess to retain an insulation member for supporting said other lead, the recess in the flange having a narrow continuation through which the inlet connection to the first lead is received.

5. A gas oven having a heating compartment, a gas burner for providing heat to the heating compartment, and a thermocouple for controlling the gas burner and thereby heat input to the heating compartment disposed in said heating compartment, said thermocouple having at least partially separated junctions and being mounted upon said gas burner, one of the leads of said thermocouple consisting of a planar sheet metal strip having a forward end which envelopes the other lead of the thermocouple to form the hot junction of the thermocouple, and the rearmost end of said sheet metal strip being provided with a flange portion formed with a recess to retain an insulation member for supporting said other lead, the recess in the flange having a narrow continuation through which the inlet connection to the first lead is received.

6. A thermocouple for use in the heating compartment of a gas oven, said thermocouple having at least partially separated junctions, one of the leads of said thermocouple consisting of a planar sheet metal strip having a forward end which envelopes the other lead of the thermocouple to form the hot junction of the thermocouple.

7. A thermocouple for use in the heating compartment of a gas oven, said thermocouple having at least partially separated junctions, one of the leads of said thermocouple consisting of a planar sheet metal strip having a forward end which envelopes the other lead of the thermocouple to form the hot junction of the thermocouple, and said sheet metal strip being formed with apertures for reception of securing means to fasten the thermocouple to a supporting surface.

8. A thermocouple for use in the heating compartment of a gas oven, said thermocouple having at least partially separated junctions, one of the leads of said thermocouple consisting of a planar sheet metal strip having a forward end which envelopes the other lead of the thermocouple to form the hot junction of the thermocouple, and the rear-most end of said sheet metal strip being provided with a flange portion formed with a recess to retain an insulation member for supporting said other lead.

9. A thermocouple for use in the heating compartment of a gas oven, said thermocouple having at least partially separated junctions, one of the leads of said thermocouple consisting of a planar sheet metal strip having a forward end which envelopes the other lead of the thermocouple to form the hot junction of the thermocouple, and the rear-most end of said sheet metal strip being provided with a flange portion formed with a recess to retain an insulation member for supporting said other lead, the recess in the flange having a narrow continuation through which the inlet connection to the first lead is received.

References Cited

UNITED STATES PATENTS

| | | | |
|---|---|---|---|
| 289,631 | 12/1883 | Eaton | 136—208 |
| 715,265 | 12/1902 | Heil | 136—230 |
| 2,126,564 | 8/1938 | Leins | 136—220 |
| 2,189,829 | 2/1940 | Wunsch et al. | 136—219 |
| 2,291,567 | 7/1942 | Wunsch et al. | 136—217 |
| 2,311,785 | 2/1943 | Sparrow | 136—220 |
| 2,315,773 | 4/1943 | Couzens | 136—217 X |
| 2,649,490 | 8/1953 | Greenamyer | 136——219 |
| 2,833,843 | 5/1958 | Jackson et al. | 136—219 |

WINSTON A. DOUGLAS, *Primary Examiner.*

A. M. BEKELMAN, *Assistant Examiner.*